United States Patent [19]
Baker

[11] Patent Number: 4,718,690
[45] Date of Patent: Jan. 12, 1988

[54] TOW LINE

[76] Inventor: Jimmie W. Baker, HC01 Box 274-A, Kingston, Id. 83839

[21] Appl. No.: 931,051

[22] Filed: Nov. 17, 1986

[51] Int. Cl.⁴ .............................................. B60D 1/18
[52] U.S. Cl. .................................... 280/480; 280/483
[58] Field of Search ............... 280/480, 486, 483, 457, 280/415 R, 415 A; 114/215, 216, 247, 253

[56] References Cited

U.S. PATENT DOCUMENTS

| | | | |
|---|---|---|---|
| 1,408,081 | 2/1922 | Deems | 280/486 |
| 3,787,069 | 1/1974 | Chauncey | 280/486 |
| 4,426,097 | 1/1984 | Livingston | 280/415 A |

FOREIGN PATENT DOCUMENTS 1810668  11/1968  Fed. Rep. of Germany ...... 280/480

Primary Examiner—John A. Pekar
Attorney, Agent, or Firm—Gilden & Israel

[57] ABSTRACT

A tow line attachable between a towing vehicle and some other structure has an intermediately positioned spring assembly which substantially reduces jarring and jerking movements. A pair of frame attached cables are directed from the towing vehicle to a tubular conduit and the conduit is fixedly secured to the vehicle bumper hitch. The towing cable is retained within the conduit and is abuttable with an enclosed spring. The tow line compresses the spring within the conduit with the spring then serving to compensate for rapid changes in vehicle velocity.

3 Claims, 3 Drawing Figures

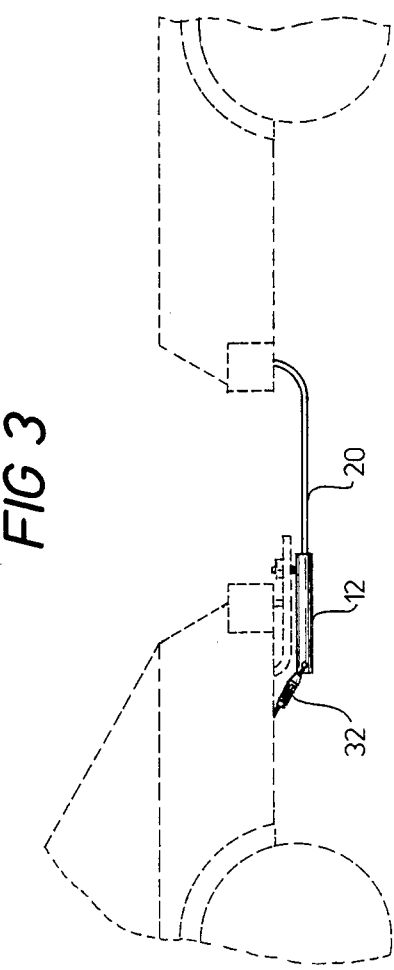

TOW LINE

BACKGROUND OF THE INVENTION

1. Field of the Invention

The present invention relate to tow lines, and more particularly pertains to a new and improved tow line which utilizes an intermediate positioned spring assembly for absorbing jerking and jarring movements.

2. Description of the Prior Art

The use of tow line arrangements which rely upon intermediately positioned springs to absorb jerking and jarring movements is well known in the prior art. Such an assembly is shown in U.S. Pat. No. 1,325,422, which issued to G. Stuart on Dec. 16, 1919. The Stuart tow line is attachable between a towing vehicle and a towed vehicle, and a pair of intermediately positioned springs join the two separate sections of the tow line together. The springs absorb sudden jerking and jarring movements which occasion the towing of an object.

Similarly, U.S. Pat. No. 1,985,468, which issued to E. Strang on Dec. 25, 1934, discloses a tow line which includes the use of an intermediately positioned shock absorber. Two separate sections of the tow line are attachable to respective ends of the shock absorber, while the shock absorber is of a piston-like construction which includes a first rigid member slidably positioned within the cylindrically-shaped shock absorber and a second rigid member slidably positioned within the first mentioned member. The first and second members are relatively movable with respect to the shock absorber housing, with first and second springs cushioning movement between the respective parts. While the Strang device is most likely functional for its intended purpose, it can be appreciated that the construction of the chock absorber assembly associated with the tow line is substantially difficult and expensive to manufacture, which most likely accounts for its lack of commercial success.

Accordingly, there appears to be a continuing need for new and improved shock absorbing arrangements for use in combination with tow lines, wherein such shock absorbing tow lines could be inexpensively and easily manufactured, thus to make them readily available to the consuming public, and in this respect, the present invention substantially fulfills this need.

SUMMARY OF THE INVENTION

In view of the foregoing disadvantages inherent in the known types of shock absorbing tow lines now present in the prior art, the present invention provides an improved shock absorbing tow line wherein the same can be inexpensively and easily manufactured and is operable to substantially eliminate jerking and jarring movements between a towing vehicle and a towed object. As such, the general purpose of the present invention, which will be described subsequently in greater detail, is to provide a new and improved shock absorbing tow line which has all the advantages of the prior art shock absorbing tow lines and none of the disadvantages.

To attain this, the present invention comprises a pair of flexible lines attachable to the frame of a towing vehicle, with the free ends of the lines being fixedly securable to one end of an enclosed metallic conduit. The conduit in turn is fixedly secured to the towing vehicle's bumper hitch. A tow line is attachable to an object to be towed, and extends through an aperture in the opposed end of the conduit, with this end of the tow line being attached to a washer which compresses a spring against the enclosed end of the conduit. In this regard, the end of the tow line attached to the towed object is movable relative to the conduit in response to a compression of the spring captured therein. When the conduit is attached to the bumper hitch, turnbuckles are used to effect a secure tightening of the frame connection lines to the vehicle frame structure.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shock absorbing tow line which has all the advantages of the prior art shock absorbing tow lines and none of the disadvantages.

It is another object of the present invention to provide a new and improved shock absorbing tow line which may be easily and efficiently manufactured and marketed.

It is a further object of the present invention to provide a new and improved shock absorbing tow line which is of a durable and reliable construction.

An even further object of the present invention is to provide a new and improved shock absorbing tow line which is susceptible of a low cost of manufacture with regard to both materials and labor, and which accordingly is then susceptible of low prices of sale to the consuming public, thereby making such shock absorbing tow lines economically available to the buying public.

Still yet another object of the present invention is to provide a new and improved shock absorbing tow line which provides in the apparatuses and methods of the prior art some of the advantages thereof, while simultaneously overcoming some of the disadvantages normally associated therewith.

Still another object of the present invention is to provide a new and improved shock absorbing tow line which includes the use of an intermediately positioned spring to effect the absorption of jerking and jarring movements between a towing vehicle and a towed object.

Yet another object of the present invention is to provide a new and improved shock absorbing tow line which is selectively attachable to a vehicle bumper hitch assembly.

These together with other objects of the invention, along with the various features of novelty which characterize the invention, are pointed out with particularity in the claims annexed to and forming a part of this diclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 shows the shock absorbing tow line connected to a towing vehicle.

DESCRIPTION OF THE PREFERRED EMBODIMENT

Figure 1:
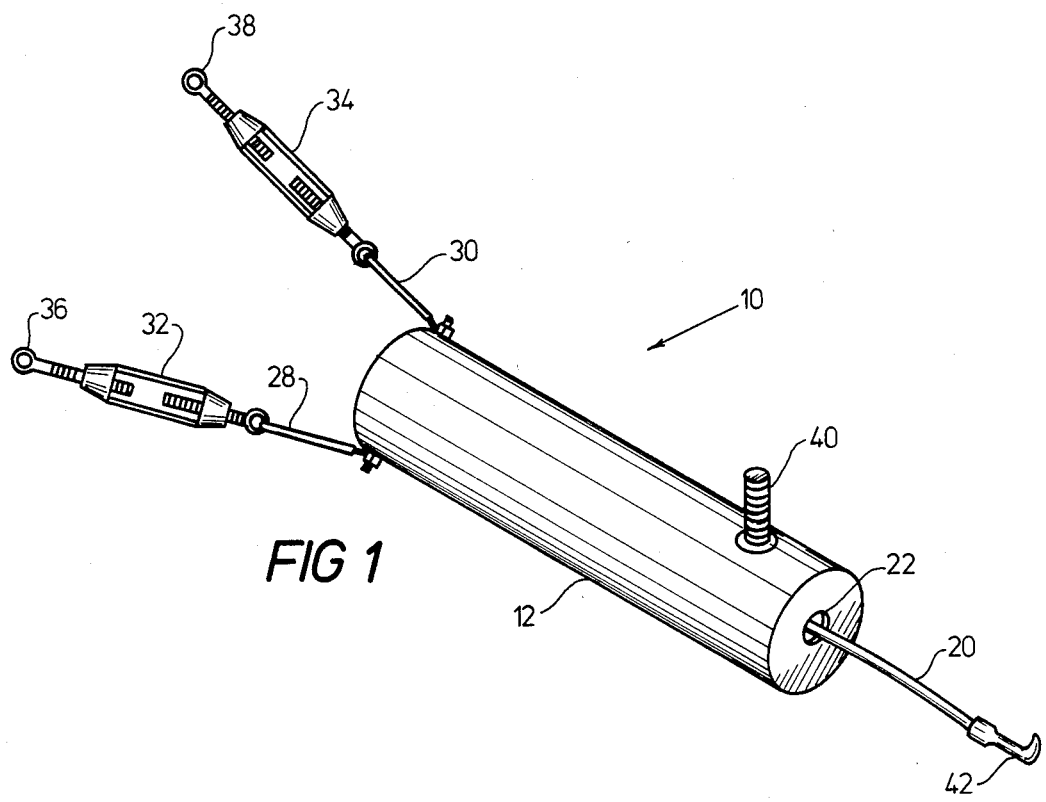
FIG. 1 is a perspective view of the shock absorbing tow line comprising the present invention.
Figure 2:
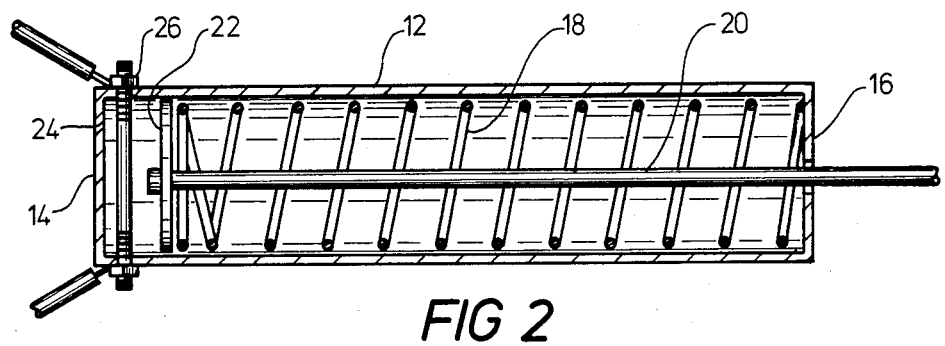
FIG. 2 is a cross-sectional view thereof.

With reference now to the drawings, and in particular to FIGS. 1 and 2 thereof, a new and improved shock absorbing tow line embodying the principles and concepts of the present invention and generally designated by the reference numeral 10 will be described.

More particularly, it will be noted that the shock absorbing tow line 10 essentially comprises a metallic tubular housing 12 having enclosed ends 14, 16. A coiled spring 18 is retained within the housing 12, and a conventional flexible tow line 20 is directed through an aperture 22 formed through the housing end 16. The free end of the tow line 20 is fixedly secured to a washer or plate member 22 movable along an interior axial length of the housing 12. As best illustrated in FIG. 2 of the drawings, the coil spring 18 is positioned between the plate 22 and the interior surface of the housing end 16.

A bolt member 24 is attached through an end of the housing 12 proximate the end 14, with ends of the bolt member extending outwardly from the housing and having nuts 26 threadably attached thereto. A pair of flexible cables 28, 30 are attachable to opposed ends of the bolt member 24, as clearly illustrated in the drawings, with respective turnbuckles 32, 34 being attached to these cables. The opposed respective ends 36, 38 of the turnbuckles 32, 34 can be provided with other cables, hooks, eyelets, or the like, to effect their attachment to the frame structure of a towing vehicle.

As clearly illustrated in FIG. 1, a large threaded member 40 is welded or otherwise fixedly secured to the housing 12 and extends outwardly therefrom. Also illustrated in FIG. 1 is an attachment hook 42 of a conventional design which is attached to the remaining free end of the towing cable 20.

With respect to the manner of use and operation of the present invention, it can be appreciated that the housing 12 can be attached to a conventional bumper hitch on a towing vehicle simply by attaching the same to the bumper hitch through a use of the threaded member 40. The cables 28, 30 can then be appropriately attached to the vehicle frame structure, and the turnbuckles 32, 34 can be tightened to obtain the desired tension. An object to be towed is then fastened to the tow line 20, and when the towing vehicle begins to move, the spring 18 will be appropriately compressed and extended to absorb jerking and jarring movements.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A shock absorbing tow line assembly comprising:
   a. housing means;
   b. tow lines means attachable to an object to be towed;
   c. spring means operably retained in said housing means, said spring means being attached to one free end of said tow line means, said one free end of said tow line means being fixedly secured to a plate member movable within said housing means, said spring means being retained between said plate member and a first enclosed end of said housing means, said tow line means extending through a small aperture in said first enclosed end;
   d. first vehicle attachment means for effecting an attachment of said housing means to a bumper hitch of a towing vehicle; and,
   e. second vehicle attachment means for effecting an attachment of said housing means to said towing vehicle, said second attachment means including at least one cable member attachable between said housing means and a frame structure of said towing vehicle.

2. The shock absorbing tow line assembly of claim 1; and further including turnbuckle means forming a part of said second vehicle attachment means, said turnbuckle means allowing a tensioning of said second vehicle attachment means with respect to its attachment between said frame structure and said housing means.

3. The shock absorbing tow line assembly of claim 2, wherein said first vehicle attachment means comprises a threaded member fixedly secured to and extending outwardly from said housing means, said threaded member being attachable to said bumper hitch.

* * * * *